(12) United States Patent  
Izadpanah

(10) Patent No.: US 7,324,755 B2
(45) Date of Patent: Jan. 29, 2008

(54) OPTICAL CODE-DIVISION MULTIPLE ACCESS TRANSMISSION SYSTEM AND METHOD

(75) Inventor: Hossein Izadpanah, Newburry Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 611 days.

(21) Appl. No.: 10/463,623

(22) Filed: Jun. 16, 2003

(65) Prior Publication Data

US 2004/0018018 A1   Jan. 29, 2004

Related U.S. Application Data

(60) Provisional application No. 60/393,512, filed on Jul. 2, 2002.

(51) Int. Cl.
*H04J 4/00* (2006.01)
*H04J 14/00* (2006.01)

(52) U.S. Cl. .......................................... 398/78; 398/77
(58) Field of Classification Search ................ 398/77, 398/78; 370/335, 320
See application file for complete search history.

(56) References Cited

U.S. PATENT DOCUMENTS

| 5,363,221 | A | | 11/1994 | Sutton et al. | |
|---|---|---|---|---|---|
| 5,760,941 | A | * | 6/1998 | Young et al. | ............... 398/183 |
| 5,946,120 | A | | 8/1999 | Chen | |
| 6,807,372 | B1 | * | 10/2004 | Lee et al. | ..................... 398/78 |
| 2002/0196509 | A1 | * | 12/2002 | Smilanski et al. | .......... 359/188 |

FOREIGN PATENT DOCUMENTS

| WO | WO 00 08783 A | 2/2000 |
|---|---|---|
| WO | WO 01 35551 A | 5/2001 |

OTHER PUBLICATIONS

Clark G., Willebrand H., Achour M., "Hybrid free space optical/microwave communication networks: A unique solution for ultrahigh-speed local loop connectivity," Proceedings of the SPIE—The ISOE, OWC III, vol. 4214, Nov. 6-7, 2000, pp. 46-54, XP001149555, Boston, MA, USA.

(Continued)

*Primary Examiner*—Jason Chan
*Assistant Examiner*—Nathan M. Curs
(74) *Attorney, Agent, or Firm*—Tope-McKay & Associates

(57) ABSTRACT

An optical code division multiple access transmission and reception system is presented. The transmission system comprises an optical comb generator for producing multiple discrete optical signal components comprising a plurality of equally spaced wavelength components. A serial-to-parallel converter is connected with the optical comb generator for receiving receiving the serial signal components and for converting a selected group of the serial signal components into parallel signal components. An optical free-space code mask is connected with the serial-to-parallel converter for receiving the parallel signal components and for selecting two separate groups of optical signal components to generate two subsets of signal components, each for representing an associated binary data value from a data stream. The transmission system may comprise further components to enable transmission via fiber optic cable or into free-space via an antenna. The reception system operates opposite the transmission system to de-code a coded signal, obtaining the original data.

49 Claims, 6 Drawing Sheets

OTHER PUBLICATIONS

LightPointe Communications, Inc., "LMDS Versus Free Space Optical Networks," www.lightpointe.com/index.cfm/fuseaction/technology.WhitePapers, Doc. No. 610-006514-H0001, Feb. 2001.

R.A. Mullen, K.T. Celmer, M. Foster, J. wooten, J. Miller, J.C. Kean, D. Carter, M. Kefauver, B. Singh, M. Achour, and H. Willebrand, "Wireless Optics Protection of Fiber via SONET Ring Closure," www.lightpointe.com/index.cfm/fuseaction/technology.WhitePapers, 2001.

* cited by examiner

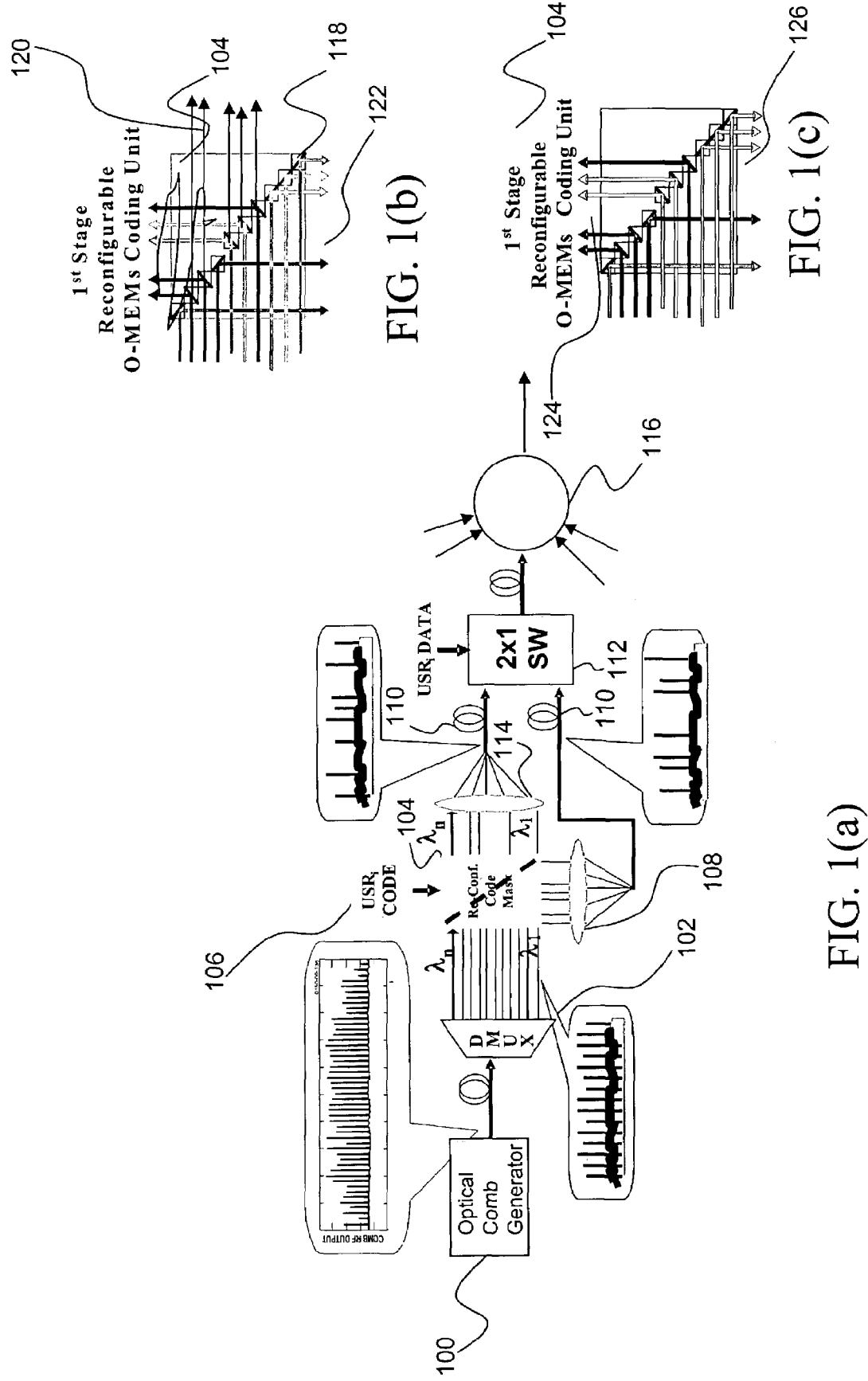

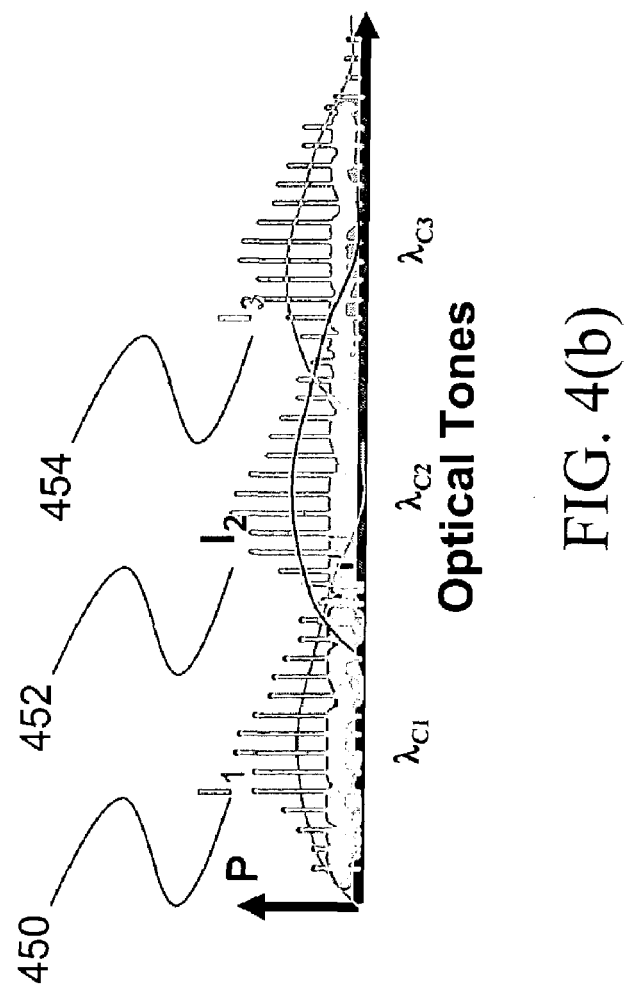
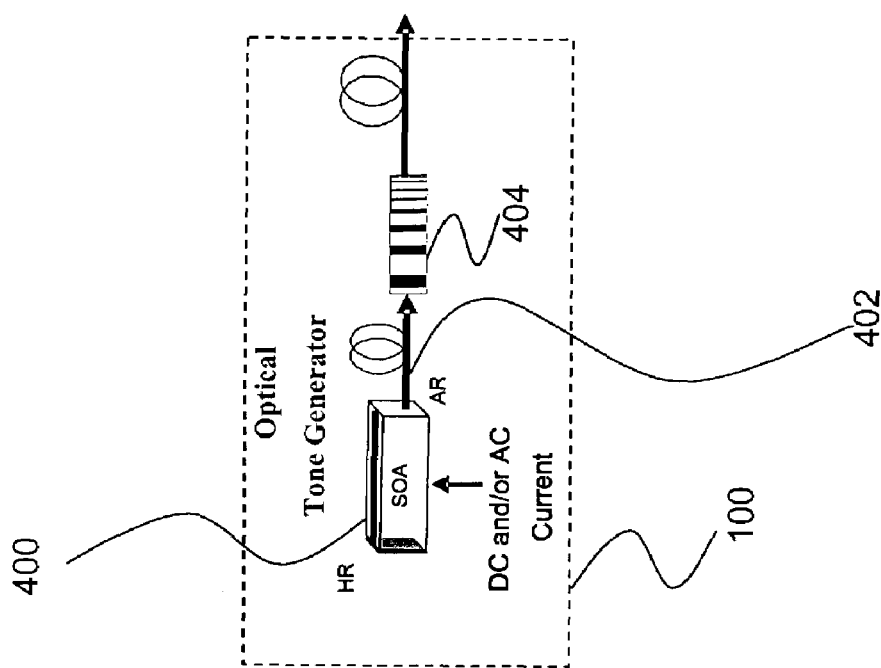
FIG. 4(b)
FIG. 4(a)

OPTICAL CODE-DIVISION MULTIPLE ACCESS TRANSMISSION SYSTEM AND METHOD

PRIORITY CLAIM

The present invention claims priority to provisional application 60/393,512, titled "Generation Methods for Coded Optical/Electrical Frequency Tones for OFDM/CDMA System Applications," filed with the U.S. patent and Trademark Office on Jul. 2, 2002.

BACKGROUND (1) Technical Field

The present invention relates to field of optical and radio communications. More specifically, the present invention relates to a mechanism for generating coded optical and/or electrical frequency tones with a corresponding transceiver architecture, which may be incorporated into a multiple user code division multiple access (CDMA) communication system.

(2) Discussion

Secure optical communication systems, both fiber optic and free space, currently use several different coding and encryption schemes. One example of such a scheme is the multi-user spread spectrum code-division multiple access (CDMA) scheme. The conventional spread spectrum CDMA scheme spreads a signal over a wide and continuous frequency range according to a code. After it is received at a receiver, it is decoded using a corresponding key in order to separate a user access that user's data in the transmission.

Although the spread spectrum CDMA technique is useful for coding and encryption, it would be advantageous to provide a discrete CDMA wavelength spreading technique that uses combinations of discrete optical wavelengths produced by an optical comb generator to encode each user's data by permutation. Such a technique would provide for a greater number of user codes and a greater flexibility for dynamic code generation/alteration. Additionally, such a technique would lead to reduced signal detection complexity at the receiver (and accordingly equipment complexity) as well as increasing the received signal to noise ratio, which would thereby enhance signal quality.

SUMMARY

BRIEF DESCRIPTION OF THE DRAWINGS

The objects, features and advantages of the present invention will be apparent from the following detailed description of the various aspects of the invention in conjunction with reference to the following drawings.

FIG. 1(a) is a functional block diagram of a discrete optical CDMA harmonic impulse transmitter block incorporating an optical comb generator, an optical MEMs coding mask, a bipolar signal generation method, and a user data bipolar modulating scheme of the present invention;

FIG. 1(b) is a more detailed illustration of the proposed optical MEMs coding mask of the present invention, configured to selectively pass/reflect user bipolar codes;

FIG. 1(c) is a more detailed illustration of the proposed optical MEMs coding mask of the present invention, configured to selectively reflect user bipolar codes in two different directions;

FIG. 4(a) is a block diagram of an optical comb generator incorporating a semiconductor optical amplifier and a chirped grating functional block;

FIG. 4(b) is a multi-band frequency diagram of the output of the comb generator of FIG. 4(a), tuned by controlling the semiconductor optical amplifier to produce three different optical tone groups, each having a different center frequency;

DETAILED DESCRIPTION

Figure 2A:
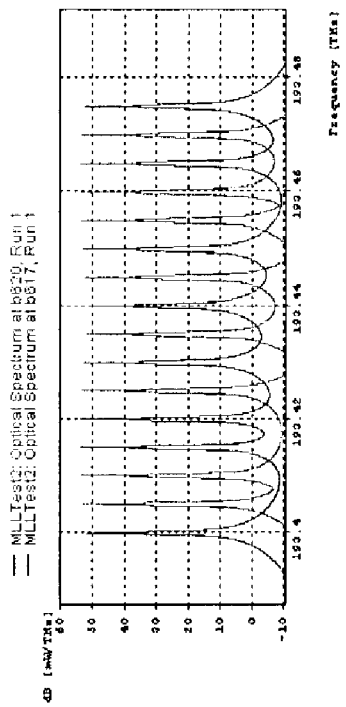
FIG. 2(a) is a graph of a typical set of tones generated by an optical comb generator, depicting 100+ modes at 10 GHz modal spacing as an example.

The present invention relates to field of optical and radio communications. More specifically, the present invention relates to a mechanism for generating coded optical and/or electrical frequency tones with a corresponding transceiver architecture, which may be incorporated into a multiple user code division multiple access (CDMA) communication system. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

(1) Discussion a. Introduction

The present invention provides a method and an apparatus for coding optical and/or electrical frequency tones to provide for discrete CDMA wavelength spreading. The coding block of the present invention generally comprises a plurality of optical micro electromechanical (MEM) mirrors that act, in the transmitting part of a communication system, to selectively reflect or pass selected ones of the frequency tones to set up two different sets of frequency tones. Each of the sets of frequency tones is used to represent one of two symbols in a bipolar data scheme (bipolar data has two possible values, represented by symbols, such as "0" and "1"). Generally, one set of tones is to represent the symbol "1" and the other set is to represent the symbol "0." A 2×1 gating device selects the proper sets according to the modulating data symbol, "1" or "0," and switches to the output fiber. The resulting output signal is then transmitted to a receiver, where a corresponding optical-MEMs decoding block is used to decode the received bipolar coded signal to recover the original user data.

In addition to the coding block, a time-slot interchange may be provided. The time-slot interchange receives the coded frequency tones outputted from the coding block and alters their time-slot position ordering. The optical-MEMs mirrors in the second block are positioned to individually reflect each of the frequency tones along a different path length in order to add a desired amount of delay to each.

The optical-MEMs coding block and the time-slot interchange are incorporated into a communication system transmitter and receiver. Greater detail regarding the optical-MEMs coding block, the time-slot interchange, and the communication system incorporating them therein will now be provided.

b. Details of the Present Invention

An illustrative diagram of an optical CDMA transmitter block incorporating an optical-MEMs coding mask of the present invention is presented in FIG. 1(a), and a more detailed illustration of two example versions of the optical-MEMs coding mask of the present invention is presented in FIG. 1(b) and FIG. 1(c). In the system, an optical comb generator 100 is provided for generating a plurality of optical tones. The optical comb generator 100 generates tones in the form of a comb with a large number of phase-locked optical tones (thus acting as a wideband, discrete, and well-defined multi-wavelength source) with controlled inter-modal spacing and granularity equal to its drive frequency. In one aspect, the optical comb generator 100 incorporates a combination of a semiconductor optical amplifier (SOA) gain block, a length of fiber to act as an external cavity, and a chirped/tunable fiber grating. A passive serial-to-parallel (demultiplexing) converter 102 is connected with the comb generator 101 to receive serial tones therefrom and to convert them to parallel tones for transmission to the optical-MEMs code mask 104.

As previously mentioned, the serial optical tones are converted to parallel optical tones by the serial-to-parallel converter 102, and are further processed in the optical-MEMs code mask 110 to generated codes consisting of subsets of the parallel optical tones, onto which data is modulated. The optical-MEMs code mask 104 may be programmed via a user code 106 to group the optical tones according to a user-per mutated code in a unique scheme for each user.

After the optical-MEMs code mask 104 has separated the parallel optical tones into two tone groups or sets (e.g., as mentioned before, for the representation of "0"s and "1"s in the case of a bipolar/binary data scheme), each of the groups of optical tones are passed through a combiner 108 (a lens, for example), which multiplexes (combines) the components into a length of fiber 110 to provide two groups of serial optical tones. The groups of serial optical tones are provided to a 2×1 switch 112. The 2×1 switch 112, is activated by binary user data to selectively pass one of the groups of serial optical tones to represent "0"s and the other to represent "1"s. The output of the 2×1 switch 112 is a series of pulses of the coded groups of serial optical tones, which represent user data 114. This output is subsequently transmitted via a "wired" or wireless transmission system for receipt and decoding at a receiver. An optional combining device 116, such as a star coupler, is shown for receiving transmissions from multiple transmission systems for transmission across one fiber line.

With regard to the serial-to-parallel converter 102, it is desirable to use an asymmetric Fabric-Peru dispersive element as a demultiplexer to spatially separate the individual mode signals for launching into separate fibers. However, the serial-to-parallel converter 102 can be any device which functions as such, non-limiting examples including array wave guides (AWGS) and sets of micro-resonators. The output of the serial-to-parallel converter 102 is provided to the optical code mask for coding.

The optical-MEMs code mask 104 is connected to receive the serial optical tones from the serial-to-parallel converter 102, and is used to select/de-select the individual modes and the frequency lines for the O-CDMA scheme. The generated signal is OFDM in nature, so in the time domain it comprises short pulses with a pulse repetition period (PROP) equal to the mode spacing (i.e., 100 MHz in the above example). The optical-MEMs coding mask 104 provides multi-wavelength spectral encoding by using a two-dimensional optical-MEM switching array that allows for dynamic re-configuration at sub-millisecond speed for each user. As mentioned before, an illustrative diagram of a version of the optical-MEMs code mask 104 is presented in FIG. 1(b), which acts to selectively pass/reflect user bipolar codes. The code mask 104 serves as a wavelength encoding unit to group incident wavelengths into two permutation maps that are selected as codes. As shown, the unit comprises a programmable two-dimensional set of diagonally arranged free-space optical-MEM switching mirrors 118. In the figure, the sets of interleaved discrete optical tones are depicted as two separate spectral groups, including a first group 120 for data symbol "1," and its complement 122 for symbol "0." Examples of possible groupings for the selected optical tones include even/odd modes, upper/lower modes, and mixes of randomly selected modes.

Each O-MEM mirror is programmed to selectively direct ones of the incoming tones into its respective group. In the diagonally positioned example optical-MEMs code mask 104 shown in FIG. 1(b), the mirrors are selectively activated to either reflect tones 90 degrees from their original direction or to allow them to pass un-reflected. These groups are depicted by numbers 120 and 122, though not in any particular order.

Another version of the optical-MEMs coding mask 104 is depicted in FIG. 1(c), where the mirrors direct the tones into groups by selectively reflecting them +/−90 degrees from their original direction. The groups in this case are depicted by numbers 124 and 126, though again not in any particular order.

Although two configurations for the optical-MEMs code mask 104 are depicted in FIG. 1(b) and FIG. 1(c), a variety of other reflection schemes can be used. For example, the tones could be reflected in directions other than +/−90 degrees. The switching code can be dynamically reconfirmed at sub-millisecond speed for each communication session.

Once the groups of tones have been separated, they are passed to the combiners 108, which are typically collecting lenses, that combine each group of tones separately and couple them into the lengths of fiber 110 for provision to the 2×1 switch 112. The selected complementary tones are orthogonal in nature and spread over the entire wavelength block to provide higher system capacity and security. The number of tones in the block, the wavelength spectrum assigned to a particular user, and the permutation rule determines the maximum number of unique user codes that can be accommodated by a single unit.

The optical switch 112 is typically a 2×1 electro-optic switch that is used to gate (modulate) the tone groups to the switch output in order to impose the user data ("1"s and "0"s) onto the signal sent through the output.

Figure 2B:
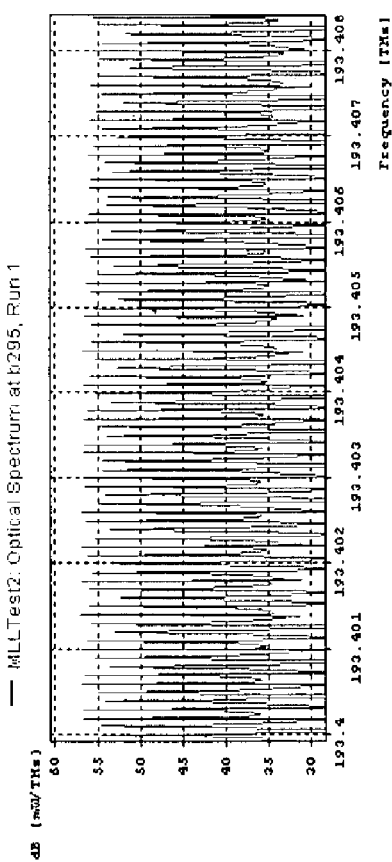
FIG. 2(b) is a graph of a selected block of wavelengths for input into the code mask of the present invention; 16 modes are shown in the graph as an example.
Figure 2C:
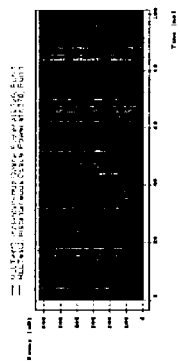
FIG. 2(c) is a frequency-domain graph of a typical example of a single-user complementary bipolar code generated from the selected block depicted in FIG. 2(b)
Figure 2D:
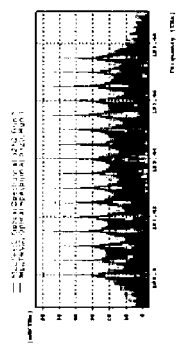
FIG. 2(d) is a time-domain graph of a typical example of a single-user modulated bipolar code generated from the selected block depicted in FIG. 2(b)

As an example of the operation of the system, a set of 100+ optical frequencies (modes) with 10 GHz modal spacing is shown in FIG. 2(a). A demultiplexed block of 16 selected wavelengths for input into the optical-MEMs code mask 104 is shown in FIG. 2(b). A typical single-user bipolar 8-chips spectral code is shown in FIG. 2(c). The corresponding transmitter time-domain waveform is shown in FIG. 2(d). As the figures indicate, the user coded and modulated signal encompasses the entire optical spectral blocks.

It is noteworthy that the coding and bipolar modulation scheme provides for a coding process for each user that is passive and static, that does not involve any high-speed electro-optic processes, and that is fully programmable by using dynamically re-configurable optical MEM directional switches.

Figure 3B:
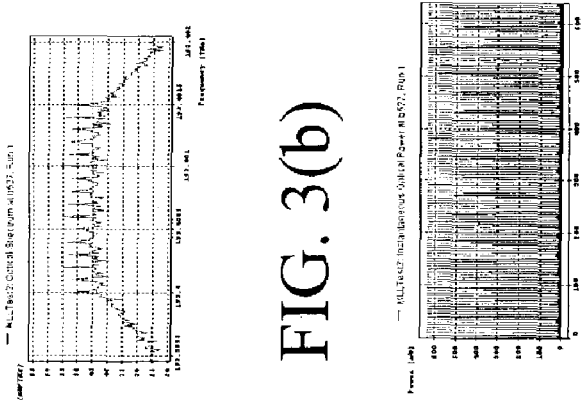
FIG. 3(b) is a graph of an example of a typical frequency spectrum waveform of a signal as received in the receiver system of FIG. 3(a)
Figure 3C:
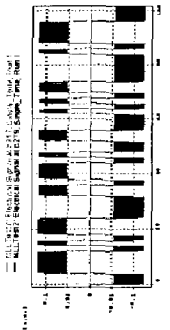
FIG. 3(c) is a graph of the time-domain modulated waveform corresponding to the frequency spectrum waveform of FIG. 3(b)
Figure 3D:
FIG. 3(d) is a graph of the bipolar user data detected in the received signal characterized in the graphs of FIG. 3(b) and FIG. 3(c)
Figure 3A:
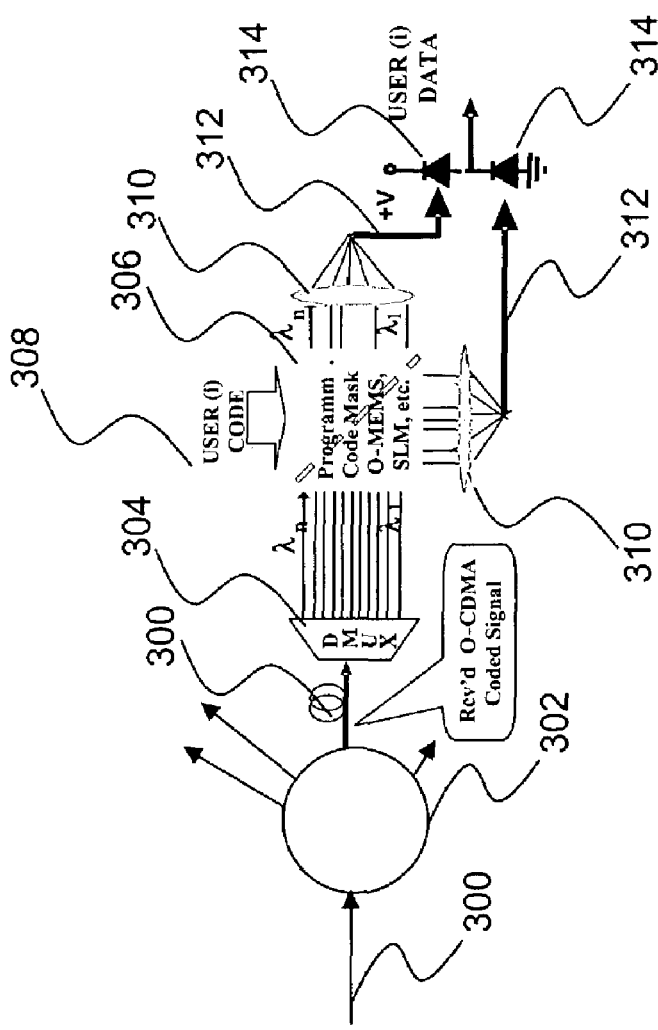
FIG. 3(a) is a block diagram showing the functional blocks of a bipolar optical CDMA receiver system incorporating an optical MEMs decoding block according to the present invention.

The receiver functional blocks and typical input for a system having a multi-user combined spectrum and repetitive interleaved short pulses (assuming no user data time marking) are shown in FIG. 3(a). The, receiver system consists of the same code mask and processing blocks used at the transmitter. The serial tones of the incoming signal are received via an incoming length of fiber 300. As shown, the length of fiber 300 can optionally provide multiple user signals to a de-combining device 302 such as a star de-coupler, or the fiber 300 may be connected to provide the tones directly to a serial-to-parallel converter 304 for conversion to parallel tones. The serial-to-parallel converter 304 is typically a replica of the serial-to-parallel converter 102 of the transmitting system (referring to FIG. 1(a)). After conversion to parallel tones, the parallel tones are passed to an optical-MEMs decoding mask 306 that is a replica of the optical-MEMs code mask 104 in the transmitting system (referring again to FIG. 1(a)). The optical-MEMs decoding mask 306 of the receiving system may be matched with the optical-MEMs code mask 104 of the transmitting system via a user code 308. The decoded groups of parallel tones are then passed through combiners 310 and into lengths of fiber 312. The lengths of fiber 312 provide the groups of parallel tones to serially connected and center-grounded detectors 314, shown as, but not limited to photodiodes, where the transmitted user data is recovered.

Example waveforms for the signal received at the receiving portion are depicted in FIG. 3(b) and FIG. 3(c) in the frequency and time domains, respectively. The recovered data (bipolar data) is depicted in FIG. 3(d). As can be seen from the examples, the system uses very low-complexity receiver electronics, enables asynchronous operation, provides a very good signal-to-noise ratio, and yields zero non-matched output and low channel beat noise. These benefits are achieved because of the discrete optical comb from the optical comb generator 100 (referring to FIG. 1(a)). Thus, the discrete signal characteristics are beneficial for optical processing. Further benefits are provided in that the system, although passive, allows for dynamic code-hopping because the optical-MEMs code mask 104 and the decoding mask 306 are easily set and reprogrammed at sub-millisecond speed.

In another aspect of the present invention, the optical comb generator 100 (referring to FIG. 1(a)) may be configured as shown in FIG. 4(a). The optical comb generator is used as a basis for generating blocks of fine-grain optical and/or electrical frequency tones that are rapidly programmable at different center frequencies, and which may be used as an adaptive signal source as required in many types of programmable CDMA and orthogonal frequency division multiplexing (OFDM) transmitters in optical and/or radio frequency (RF) wireless communication systems. Referring to the optical comb generator 100 depicted in FIG. 4(a), the broad spectral emission characteristic of a SOA gain block 400, under a DC bias condition, in combination with the length of fiber 402, provides for the generation of a large number of closely spaced optical modes and side bands. The emission gain peak of the SOA gain block 400 is tuned by a DC bias current pump. Hence, the center wavelength of a frequency tone block generated by the optical comb generator 100 is tuned to allow the optical/electrical tones and frequency lines to be programmable. Additionally, by applying an AC current to a second set of electrodes on the SOA gain block 400, mode-locked optical tones having a fine granularity may be coherently generated in one-to-one correspondence with many center-selectable electrical tones.

A relatively long (~200-500 μm) SOA gain block 400 is desirable as the broad emission gain element. The facets of the SOA are coated as desired to obtain high reflectivity (HR.) and anti-reflectivity (AR). A minimum of three electrodes are implemented for DC bias application (center electrode) to pump the device and set/tune or shift the device gain peak. These electrodes are present in addition to two electrodes, which apply an AC current to either side of the device for gain/loss modulation and inter-modal tuning. Based on the measured and calibrated device gain data, a simple program could select and determine the center of a specific frequency block, as well as their inter-nodal values. Accordingly, different optical tone groups, 450, 452, and 454, as examples, are shown in FIG. 4(b), each having a differently-shifted center frequency.

The length of fiber 402 which serves as the external cavity is desirably a length of single-mode fiber (SMF), and is coupled with the AR coated facet of the SOA gain block 400. The fiber length is selected for proper mode spacing and to provide a useful extent of spectral coverage. For a fine granularity of optical tones (i.e., for ultra-dense wavelength-division multiplexing (DWMD), which requires spacing in the MHz range), an example would be the use of a 1550 NM center wavelength, while incorporating a 3.5 foot length of fiber, which would thereby allow for a 100 MHz modal spacing with many tens of modes being generated with useful power. Then the modes are locked, for example, in a block of 16 modes, so that it is possible to generate a 1600 MHz-wide spectrum, centered at 800 MHz. This spectrum can be shifted to a higher center frequency in multiples of 100 MHz up to many nanometers away from the original center wavelength.

The chirped/tunable fiber grating (FWG) 404 is connected with the end of the fiber cavity, and desirably has an AR coated input facet and about 50-70% reflectivity at the output facet. The length of the FWG 404 is set to fine tune the spacing of the modes received from the length of fiber 402. The nature of the chirp will determine the shape of the SOA gain spectrum. The SOA 400, the length of fiber 402, and the FWG 404 together form a tunable external cavity laser (ECL), which exhibits improved performance over distributed feedback (DAB) lasers. The length of fiber 402 in conjunction with the SOA gain block 400, provides for the tenability of usable optical lines from lower wavelengths to higher wavelengths over a ~100 NM region. The modal spacing is set by the combined length. The ECL can be modulated directly, or the output light can be modulated externally. For external modulation, the gain element is biased with the DC current to determine the maximum gain region of the spectrum. The long cavity length provides for enhanced resonator stability, and a directly modulated ECL provides a mode-locked signal once the active modulation frequency matches the round-trip time of the cavity. In particular there are two types of mode spacing available. One is related to the DC current and lapsing modes under the curve gain. The other types are when the ECL is modulated actively by an external "tuned" signal where the modulating frequency of the signal is equal to the cavity round-trip time (in this case, $f_m = f_c$).

Figure 5:
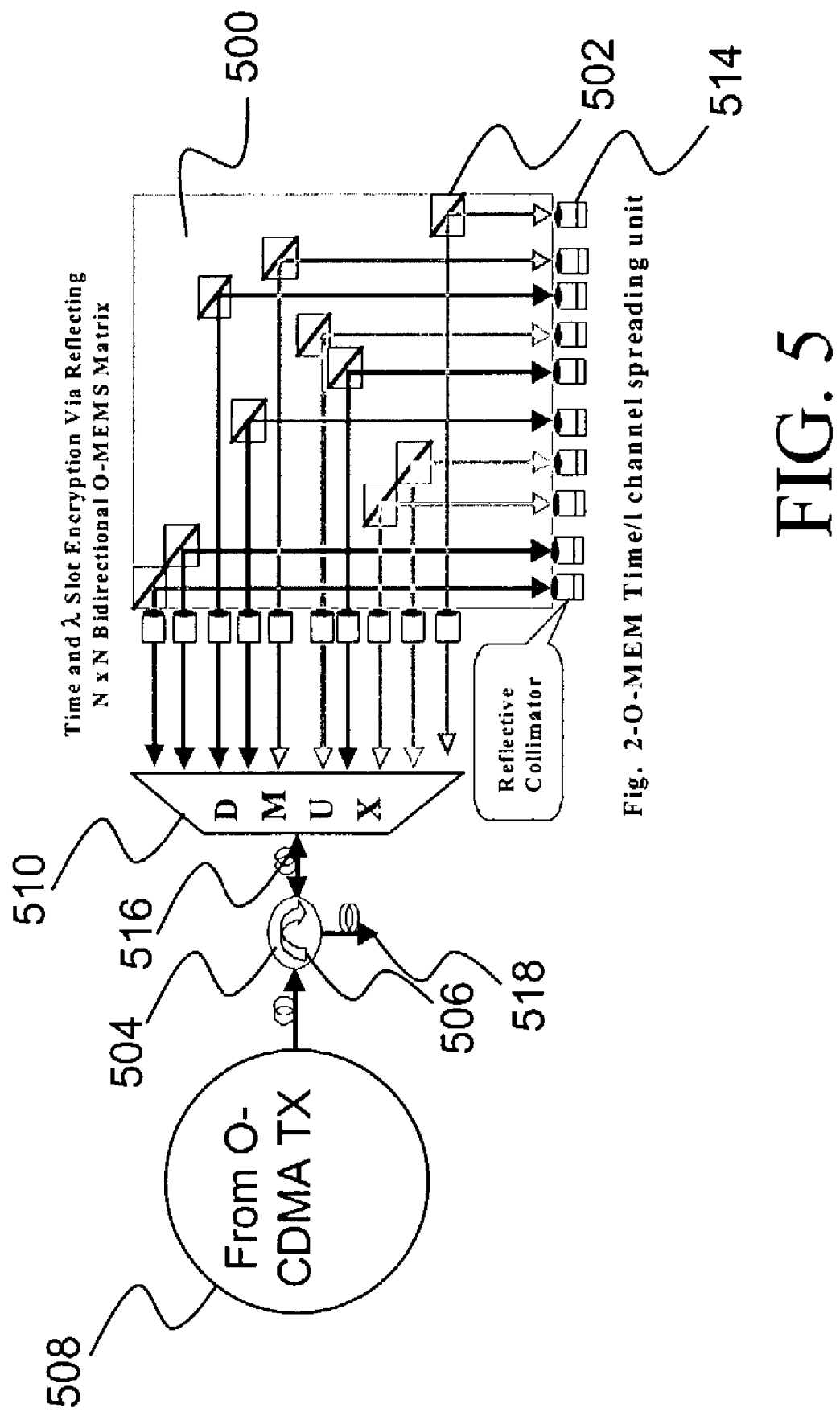
FIG. 5 is an illustrative diagram of a optical MEMs-based time-slot interchange according to the present invention.

In addition to the components previously mentioned, another level of security may be added to the system in the form of a time slot interchange, as shown in FIG. 5. Like the optical-MEMs code mask 104 and the optical-MEMs decoding mask 306, the time slot interchange 500 comprises an array of optical MEM mirrors 502. The optical MEM mirrors 502 are arranged such that various parallel tones received are reflected along paths of varying length in order to selectively delay each. The time slot interchange 500 imposes a wavelength time slot spreading encryption scheme to the combined user channels to provide for improved security before transmission. Referring to FIG. 1(a), the time slot interchange may be positioned either after the 2×1 switch 112 or after the star coupler 116. For the case of a round-trip time slot interchange operating, for example, en-route to the time slot interchange 500, the coded and modulated user signal(s) is (are) first passed through a circulator 504. The clockwise arrow 506 shown in the block of the circulator 504 operates to pass an incoming signal through the next output line shown by the arrow encountered when rotating clockwise. Thus, the signal from the input line 508 is passed through to a serial-to-parallel converter 510, where the signal is decomposed into its parallel tones 512. The tones are passed into the two-dimensional arrangement of optical MEM mirrors 502. An array of collimators 514 is positioned to reflect the tones back along their original path. The mirrors 502 and collimators 514 are positioned to add delays to the individual tones by altering their respective path lengths. Because of the delays, the individual tones are rearranged into different time slots, dictated by the programmed positions of the optical MEM mirrors. The output tones are passed through the serial-to-parallel converter 510 in the opposite direction from which they emerged, and are again combined onto a single fiber 516 as an output signal. The output signal is re-directed to an output fiber line 518 by the circulator 504 (again the first line occurring clockwise from the input). The output tones can immediately be collected into the output fiber line 518. Alternatively, the output tones can be collected by using another array of reflective collimators (not shown), where they are re-sent to the input of the time slot interchange 500 to increase the time slot spreading by adding another round trip passage therethrough. The time scrambling, encryption, and time-spreading provided by the time slot interchange 500 is very precisely controllable with picosecond resolution inherent in the fully integrated optical structure. For example, a one centimeter square chip could provide up to 200 picosecond time delays per trip. At a receiving system either before a (optional) star "decoupler" 302 or before the serial-to-parallel converter 304 (referring to FIG. 3(a)), a similar time slot interchange 500 can be positioned to reverse the encryption once the positions of the mirrors have been properly programmed with a matching map.

Figure 6:
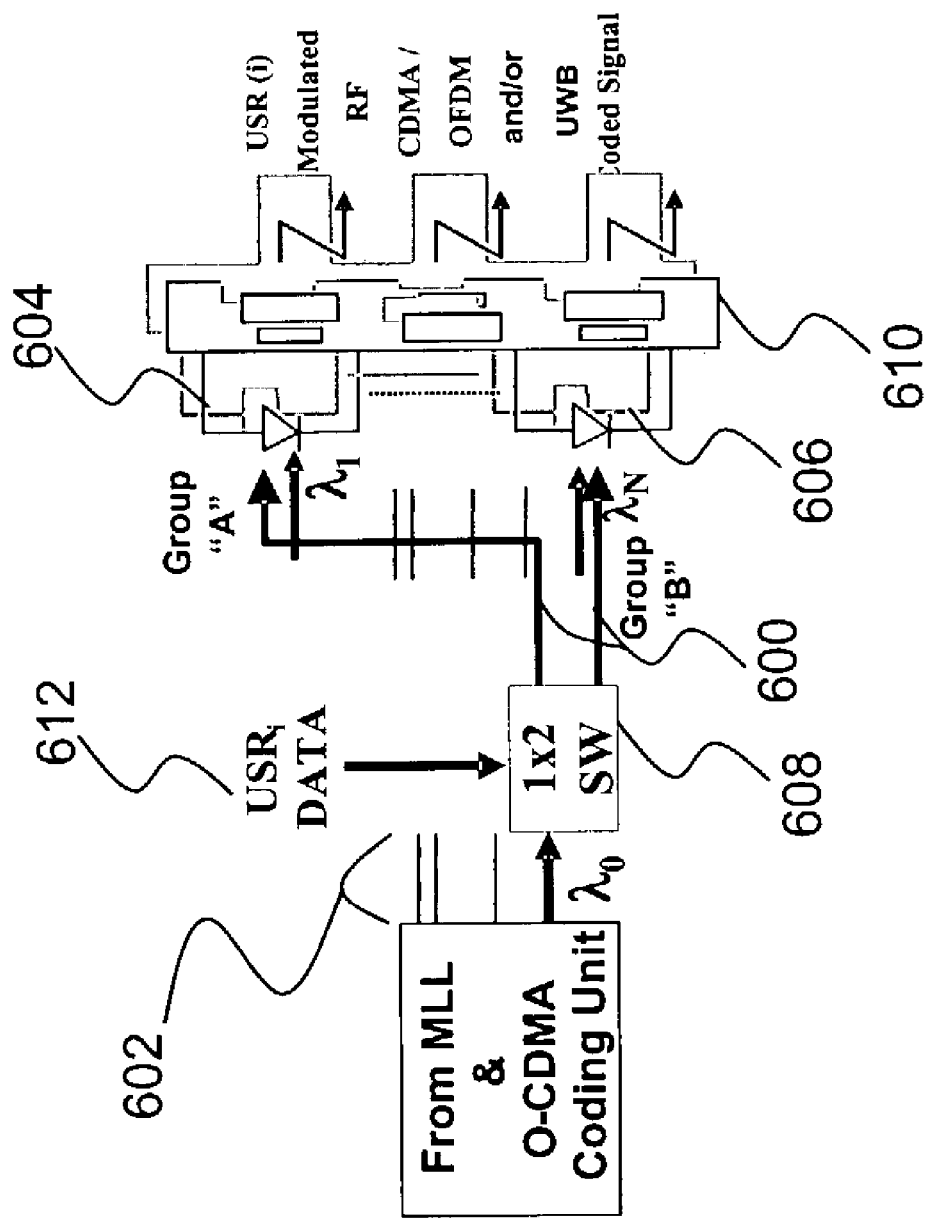
FIG. 6 is a block diagram showing the functional blocks of a bipolar radio CDMA transmitter architecture according to the present invention.

Further, as shown in FIG. 6, the CDMA/OFDM signals can also be transmitted as a wide band CDMA signal via a radio-frequency (RF) transmission system. It is worth noting that in this case, other modulation schemes may be inherently incorporated, such as such as on/off keying (BOOK), bipolar pulsation, pulse position modulation (PPM), etc. These schemes may be generated by modulating a reference wavelength 600 and beating it with other (coded) tones 602 in banks of photodiodes 604 and 606. Thus, the optical CDMA code generated by the above procedure can, on a one-to-one basis, be converted into an electrical CDMA/OFDM signal for free-space optical/RF wireless communications. As an example, a beat (reference) note (tone) of $\lambda_0$ at 1550 NM may be selected with 16 100 MHz-separated higher modes. The electrical frequencies generated by the beating process are 0, 100, 200, 300, . . . , 1500 MHz, corresponding, on a one-to-one basis, with the optical modes of the spacing of the modes of the optical comb generator 100. The RF transmission system depicted in FIG. 6 receives the groups of coded tones 602 from the optical-MEMs code mask 104 (referring to FIG. 1(a)), along with a reference wavelength 600. The reference wavelength 600 is gated by a 1×2 switch 608. One of the groups of tones is provided to a first bank of photodiodes 604 and the other group is provided to a second bank of photodiodes 606. The groups of photodiodes 604 and 606 are attached with a bank of antennas 610 for launching an electrical signal into free space. As mentioned, the reference wavelength 600 is provided to (and gated by) a 1×2 switch 608 that is driven by inputted user data 612. The value of the user data 612 (e.g., a "1" or "0") determines which output of the 1×2 switch 608 the reference wavelength 600 passes through. The outputs of the 1×2 switch 608 selectively provide the reference wavelength to either the first bank of photodiodes 604 or the second bank of photodiodes 606 for beating with the appropriate group of tones in order to generate an electrical difference tone for launching, via the bank(s) of antennas 610, into free space. Once launched, the launched tones are superimposed in a manner analogous to the operation of a parallel-to-serial converter. After launching, the bipolar RF signal can be decomposed by a receiving system in a manner that closely mirrors the transmission process to recover the transmitted data.

The present invention may thus be used for the generation of an impulse CDMA radio signal by the one-to-one translation of an optical coded CDMA signal to an electrical RF signal. When combined with a low profile patch antenna array, an ultra-wideband impulse CDMA radio system that will generate a user coded RF signal that is highly tunable in its reach, resolution, and beam direction can be created.

Each of the operations of the present invention may be embodied as steps in a method or as functionally equivalent means.

In summary, a few of the advantages of the present invention include the following:

Simultaneous multi-user spectral codes are extracted from a single mode-locked laser (MALL) comb source with a high number of phase-locked "discrete" narrow band optical tones (chips) with fine granularity and controlled modal spacing.

The complementary "two groups" distributed selected codes can be randomly mixed and interleaved, and spread over the entire wavelength block of the usable MALL spectrum. The technique provides a built-in channel redundancy (both in wavelength and time, as well as from the use of bipolar bits), resulting in a transport network protection/restoration feature against network degradation, tampering, and failure.

The impulse nature of the MALL signal provides enhanced performance with higher extinction ratio signal modulation (gating), higher processing gain, higher optical signal-to-noise ratio (OSNR) (unlike a sliced spectral source which generates spontaneous emission background noise), and lower multi-user cross-talks and inter-channel interference beat noise.

The user spectral chip and data modulation rates are quickly and dynamically reconfigurable with choices at sub-and/or harmonics of the MALL PROF. Non-limiting examples include the selection of codes from successive, alternate, or every other two frequency tones which results in pulsation frequency at $f1$=fundamental, $f2$=w*fundamental, and $f3$=3*fundamental, respectively. Sub-rate modulation will accommodate a greater number of pulses per bit period.

The signal impulse nature allows for optical time-division multiplexing (ODD) interleaved access to provide for multiplexed multi-user implementations and for increased capacity.

Another aspect of the present invention is the "discrete" spectral line coding stage with very high resolution time/wavelength slot spreading and encryption potential. This is based on fully integrated passive/static O-MEM coding mirror architecture and its potential of dynamic programmable code maps and encryption keys. O-MEM switches are important components for next-generation high-performance photonic networks (low cost, low cross-talk, and with high optical quality) for building large networks of codes, port numbers, or increased numbers of users for optical transport and mesh networks.

The present invention can aid in networking by transitioning/adapting from the core network to, for example, a metropolitan area network (MAN) and permits access of the O-CDMA into RF, mm-wave, and free-space optical (SO) wireless domains with no additional processing before launching into the air. As mentioned, an optical CDMA code generated by the above procedure can, on a one-to-one basis, be converted into an electrical CDMA/OFDM signal for free-space optical/RF wireless communications in access and distribution networks. The invention can also provide selective frequency null options for wireless interference avoidance (rejection).

For further integration, by using a star coupler 126 (as shown in FIG. 1(a)), multiple transmitting and receiving systems may be integrated into a multi-user system with time division multiple access (TDMA) for the OFDM modulation scheme tailored for use with the particular transmission media (e.g., RF, free-space optical wireless, fiber-optic, etc.). This is based on using a plurality of user codes and multiplexing signals for a variety of users.

In addition, a mode-locked clock additional drive may be used to provide a TDMA frame in which multiple users can transmit data via a single system. Thus, a TDMA frame can be provided which is partitioned into time slots for individual users (e.g., slots may be provided for User1, User2, User3, . . . , UserN in each frame). Thus, a train of short pulses at the comb pulse repetition frequency can be used for representing the individual codes for the users. To modulate the frequency-coded signal for each user, TDMA techniques can be applied (i.e., coded tones are sent in the time domain in a discrete form such that data transmissions for each user are segregated into time slots).

What is claimed is:

1. An optical code division multiple access transmission system comprising:
    an optical comb generator for producing multiple discrete spectral optical signal components comprising a plurality of equally spaced wavelength components;
    a serial-to-parallel converter connected with the optical comb generator for receiving the signal components serially and for converting a selected group of the serial signal components into parallel signal components;
    an optical free-space code mask connected with the serial-to-parallel converter for receiving the parallel signal components and for selecting two separate groups of optical signal components to generate two subsets of the signal components, each for representing an associated binary data value from a data stream, wherein the code mask comprises a two-dimensional mirror array including a plurality of optical MEM mirrors for selectively reflecting each of the optical signal components in one of two different directions when set to "on" or "off" position;
    an optical combining device positioned to receive each of the subsets of signal components, and to combine the individual signal components of each of the subsets, to form two separate combined signal component subsets; and
    a 2×1 switch having two inputs, each input positioned to receive one of the combined signal component subsets, and to selectively gate the combined signal component subsets to the output based on user data binary bits, thereby generating a modulated bipolar user signal.

2. An optical code division multiple access transmission system as set forth in claim 1, wherein the optical MEM mirrors are arranged as a diagonal set of mirrors such that for one subset of signal components, the signal components are reflected at an angle when corresponding mirrors are positioned in an "on" position and such that the other subset of signal components continues along its original path when corresponding mirrors are in an "off" position.

3. An optical code division multiple access transmission system as set forth in claim 2, wherein the optical combining device is selected from a group consisting of lenses and fiber combiners.

4. An optical code division multiple access transmission system as set forth in claim 3, further comprising a star coupler connected with the switch for receiving output therefrom, so that the output of multiple transmission systems can be combined on a single transmission line.

5. An optical code division multiple access transmission system as set forth in claim 4, wherein the optical comb generator is a mode-locked laser.

6. An optical code division multiple access transmission system as set forth in claim 5, wherein the code mask is programmable so that different schemes of subsets of the signal components may be generated with different signal components for different users to allow multiple uniquely coded data streams to be transmitted through the transmitting system.

7. An optical code division multiple access transmission system as set forth in claim 6, wherein the code mask includes means for randomly generating unique subsets of the signal components for different users, whereby each unique subset serves as a unique user code.

8. An optical code division multiple access transmission system as set forth in claim 7, wherein the mode-locked laser has a pulse repetition frequency, and wherein the pulse repetition frequency is adjustable for adjusting the frequency-spacing of the serial signal components.

9. An optical code division multiple access transmission system as set forth in claim 8, wherein the system transmits data in time slots, and wherein the system further comprises a time-slot interchange for adjusting the path of each signal component so that the signal components are scrambled in wavelength and time.

10. An optical code division multiple access transmission system as set forth in claim 9, wherein the time-slot interchange is positioned either immediately after the switch or immediately after the star coupler.

11. An optical code division multiple access transmission system as set forth in claim 10, wherein the time-slot interchange comprises:
 a serial-to-parallel demur converter for converting the signal from the switch or the star coupler into signal components;
 a plurality of mirrors in a two-dimensional array positioned to receive the signal components from the serial-to-parallel converter such that a time-based ordering of the signal components is changed by setting the different mirrors at different positions in the array, thereby selectively altering the path length of individual signal components so that the time-slot ordering of the signal components is changed to produce re-ordered signal components prior to outputting from an output of the time-slot interchange.

12. An optical code division multiple access transmission system as set forth in claim 11, wherein the position of the mirrors in the time-slot interchange provides for programmable time-slot ordering of the signal components.

13. An optical code division multiple access transmission system as set forth in claim 12, wherein the mirrors in the time-slot interchange are positioned to selectively allow for either one way or round-trip reflections to allow wider variation of the path length of the individual signal components.

14. An optical code division multiple access transmission system comprising:
 an optical comb generator for producing multiple discrete spectral optical signal components comprising a plurality of equally spaced wavelength components;
 a serial-to-parallel converter connected with the optical comb generator for receiving the signal components serially and for converting a selected group of the serial signal components into parallel signal components;
 an optical free-space code mask connected with the serial-to-parallel converter for receiving the parallel signal components and for selecting two separate groups of optical signal components to generate two subsets of the signal components, each for representing an associated binary data value from a data stream;
 an optical combining device positioned to receive each of the subsets of signal components, and to combine the individual signal components of each of the subsets, to form two separate combined signal component subsets;
 a 2×1 switch having two inputs, each input positioned to receive one of the combined signal component subsets, and to selectively gate the combined signal component subsets to the output based on user data binary bits, thereby generating a modulated bipolar user signal; and
 a star coupler connected with the switch for receiving output therefrom, so that the output of multiple transmission systems can be combined on a single transmission line.

15. An optical code division multiple access transmission system comprising:
 an optical comb generator for producing multiple discrete spectral optical signal components comprising a plurality of equally spaced wavelength components;
 a serial-to-parallel converter connected with the optical comb generator for receiving the signal components serially and for converting a selected group of the serial signal components into parallel signal components;
 an optical free-space code mask connected with the serial-to-parallel converter for receiving the parallel signal components and for selecting two separate groups of optical signal components to generate two subsets of the signal components, each for representing an associated binary data value from a data stream, wherein the code mask is programmable so that different schemes of subsets of the signal components may be generated with different signal components for different users to allow multiple uniquely coded data streams to be transmitted through the transmitting system, and wherein the code mask includes means for randomly generating unique subsets of the signal components for different users, whereby each unique subset serves as a unique user code;
 an optical combining device positioned to receive each of the subsets of signal components, and to combine the individual signal components of each of the subsets, to form two separate combined signal component subsets; and
 a 2×1 switch having two inputs, each input positioned to receive one of the combined signal component subsets, and to selectively gate the combined signal component subsets to the output based on user data binary bits, thereby generating a modulated bipolar user signal.

16. An optical code division multiple access transmission system comprising:
 an optical comb generator for producing multiple discrete spectral optical signal components comprising a plurality of equally spaced wavelength components;
 a serial-to-parallel converter connected with the optical comb generator for receiving the signal components serially and for converting a selected group of the serial signal components into parallel signal components;
 an optical free-space code mask connected with the serial-to-parallel converter for receiving the parallel signal components and for selecting two separate groups of optical signal components to generate two subsets of the signal components, each for representing an associated binary data value from a data stream;
 an optical combining device positioned to receive each of the subsets of signal components, and to combine the individual signal components of each of the subsets, to form two separate combined signal component subsets;
 a 2×1 switch having two inputs, each input positioned to receive one of the combined signal component subsets, and to selectively gate the combined signal component subsets to the output based on user data binary bits, thereby generating a modulated bipolar user signal;

wherein the system transmits data in time slots; and
wherein the system further comprises a time-slot interchange for adjusting the path of each signal component so that the signal components are scrambled in wavelength and time.

17. An optical code division multiple access transmission system as set forth in claim 16, wherein the time-slot interchange is positioned either immediately after the switch or immediately after the star coupler.

18. An optical code division multiple access transmission system as set forth in claim 17, wherein the time-slot interchange comprises:
  a serial-to-parallel demux converter for converting the signal from the switch or the star coupler into signal components;
  a plurality of mirrors in a two-dimensional array positioned to receive the signal components from the serial-to-parallel converter such that a time-based ordering of the signal components is changed by setting the different mirrors at different positions in the array, thereby selectively altering the path length of individual signal components so that the time-slot ordering of the signal components is changed to produce re-ordered signal components prior to outputting from an output of the time-slot interchange.

19. An optical code division multiple access transmission system as set forth in claim 18, wherein the position of the mirrors in the time-slot interchange provides for programmable time-slot ordering of the signal components.

20. An optical code division multiple access transmission system as set forth in claim 19, wherein the mirrors in the time-slot interchange are positioned to selectively allow for either one way or round-trip reflections to allow wider variation of the path length of the individual signal components.

21. An optical code division multiple access transmission system comprising:
  an optical comb generator for producing multiple discrete spectral optical signal components comprising a plurality of equally spaced wavelength components;
  a serial-to-parallel converter connected with the optical comb generator for receiving the signal components serially and for converting a selected group of the serial signal components into parallel signal components; and
  an optical free-space code mask connected with the serial-to-parallel converter for receiving the parallel signal components except for a reference component and for selecting two separate groups of optical signal components to generate two subsets of the signal components, each for representing an associated binary data value from a data streams;
  a bank of photodiodes, including a first set of photodiodes connected to receive one subset of the signal components from the code mask, and a second set of photodiodes connected to receive the other subset of signal components from the code mask;
  a 2×1 switch having an input positioned to receive the reference component from the serial-to-parallel converter, and to selectively gate the reference component to either the first or second set of photodiodes based on user data, for beating with the signal components of the corresponding subset of signal components to generate a plurality of electrical difference signals; and
  an antenna for launching the electrical difference signals into free-space.

22. An optical code division multiple access transmission system as set forth in claim 21, wherein the code mask comprises a two-dimensional mirror array including a plurality of optical MEM mirrors for selectively reflecting each of the optical signal components in one of two different directions.

23. An optical code division multiple access transmission system as set forth in claim 22, wherein the optical MEM mirrors are arranged as a diagonal set of mirrors such that for one subset of signal components, the signal components are reflected at an angle when corresponding mirrors are positioned in an "on" position and such that the other subset of signal components continues along its original path when corresponding mirrors are in an "off" position.

24. An optical code division multiple access transmission system as set forth in claim 23, wherein the optical comb generator is a mode-locked laser.

25. An optical code division multiple access transmission system as set forth in claim 24, wherein the code mask is programmable so that different schemes of subsets of the signal components may be generated with different signal components for different users to allow multiple uniquely coded data streams to be transmitted through the transmitting system.

26. An optical code division multiple access transmission system as set forth in claim 25, wherein the code mask includes means for randomly generating unique subsets of the signal components for different users, whereby each unique subset serves as a unique user code.

27. An optical code division multiple access transmission system as set forth in claim 26, wherein the mode-locked laser has a pulse repetition frequency, and wherein the pulse repetition frequency is adjustable for adjusting the frequency-spacing of the serial signal components.

28. An optical code division multiple access transmission system as set forth in claim 21, wherein the optical comb generator is a mode-locked laser.

29. An optical code division multiple access transmission system as set forth in claim 28, wherein the mode-locked laser has a pulse repetition frequency, and wherein the pulse repetition frequency is adjustable for adjusting the frequency-spacing of the serial signal components.

30. An optical code division multiple access transmission system as set forth in claim 21, wherein the code mask is programmable so that different schemes of subsets of the signal components may be generated with different signal components for different users to allow multiple uniquely coded data streams to be transmitted through the transmitting system.

31. An optical code division multiple access transmission system as set forth in claim 30, wherein the code mask includes means for randomly generating unique subsets of the signal components for different users, whereby each unique subset serves as a unique user codes.

32. An optical code division multiple access receiving system comprising:
  a serial-to-parallel converter connected for receiving a set of coded serial signal components and for converting the coded serial signal components into parallel signal components;
  an optical free-space decoding mask connected with the serial-to-parallel converter for receiving the parallel signal components and separating the parallel signal components into two code groups using a match key for decoding, with the match key configured to match with the coding scheme used by a code division multiple access transmitting system for a plurality of users thus, recovering two subsets of the signal components, each representing an associated binary data value from a user data stream, wherein the optical free-space decoding mask is a two-dimensional mirror array including a plurality of optical MEM mirrors for selectively reflecting each of the optical signal components in one of two different directions when set to "on" or "off" position;

a pair of optical combiners, each positioned to combine one of the two subsets of signal components into a length of fiber; and a pair of serially connected, center grounded photodiodes, each connected with one of the lengths of fiber from the optical combiners, for receiving and converting the subsets of signal components into electrical user data.

33. An optical code division multiple access receiving system as set forth in claim 32, wherein the optical MEM mirrors are arranged as a diagonal set of mirrors such that for one subset of signal components, the signal components are reflected at an angle when corresponding mirrors are positioned in an "on" position and such that the other subset of signal components continues along its original path when corresponding mirrors are in an "off" position.

34. An optical code division multiple access receiving system as set forth in claim 33, wherein the optical combiners are selected from a group consisting of lenses and fiber combiners.

35. An optical code division multiple access receiving system as set forth in claim 34, further comprising a de-combining device connected prior to the serial-to-parallel converter for receiving and de-combining signals from a plurality of user systems for transmission to a plurality of receiving systems.

36. An optical code division multiple access receiving system as set forth in claim 35, wherein the system receives data in time slots, and wherein the system further comprises a time-slot interchange positioned before the de-combining device or before the serial-to-parallel converter for adjusting the path of each signal component so that the signal components are un-scrambled in wavelength and time.

37. An optical code division multiple access receiving system as set forth in claim 36, wherein the time-slot interchange comprises:

a serial-to-parallel demur converter for converting the signal from a fiber line or from the de-combining device into signal components;

a plurality of mirrors in a two-dimensional array positioned to receive the signal components from the serial-to-parallel converter such that a time-based ordering of the signal components is changed by setting the different mirrors at different positions in the array, thereby selectively altering the path length of individual signal components so that the time-slot ordering of the signal components is changed to produce properly-ordered signal components prior to outputting from an output of the time-slot interchange.

38. An optical code division multiple access receiving system as set forth in claim 37, wherein the position of the mirrors in the time-slot interchange provides for programmable time-slot ordering of the signal components.

39. An optical code division multiple access receiving system as set forth in claim 38, wherein the mirrors in the time-slot interchange are positioned to selectively allow for either one way or round-trip reflections to allow wider variation of the path length of the individual signal components.

40. An optical code division multiple access transmission method comprising steps of:

producing multiple discrete spectral optical signal components comprising a plurality of equally spaced wavelength components;

converting a selected serial group of the signal components into parallel signal components;

selecting two separate groups of optical signal components to generate two subsets of the signal components, each for representing an associated binary data value from a data stream, wherein the selecting two separate groups comprises selectively reflecting each of the optical signal components in one of two different directions, wherein in the step of selectively reflecting, one subset of optical signal components are reflected at an angle and that the other subset of signal components continues along its original path;

programming the step of selectively reflecting each of the optical signal components so that different schemes of subsets of the signal components may be generated with different signal components for different users to allow multiple uniquely coded data streams to be transmitted;

receiving each of the subsets of signal components, and combining the individual signal components of each of the subsets, to form two separate combined signal component subsets;

selectively gating the combined signal component subsets to the output based on user data binary_bits, thereby generating a modulated bipolar user signal;

wherein the method transmits data in time slots; and wherein the method further comprises a step of adjusting the path of each signal component so that the signal components are scrambled in wavelength and time.

41. An optical code division multiple access transmission method as set forth in claim 40, wherein step of adjusting the path of each signal component comprises sub-steps of:

converting a received signal into signal components;

selectively altering the path length of individual signal components so that the time-slot ordering of the signal components is changed to produce re-ordered signal components.

42. An optical code division multiple access transmission method as set forth in claim 41, wherein the step of selectively altering the path length of individual signal components is programmable, and wherein the method further comprises a step of programming the step of selectively altering the path length of individual signal components to provide for a desired time-slot ordering of the signal components.

43. An optical code division multiple access transmission method comprising steps of:

producing multiple discrete spectral optical signal components comprising a plurality of equally spaced wavelength components;

converting a selected serial group of the signal components into parallel signal components;

selecting two separate groups of optical signal components to generate two subsets of the signal components, each for representing an associated binary data value from a data stream, wherein the two subsets of signal components are selected such that they exclude a reference component;

separately receiving the subsets of the signal components;

selectively gating the reference component to either of the subsets of signal components based on user data;

beating the signal components of the corresponding subset of signal components with the reference component to generate a plurality of electrical difference signals; and launching the electrical difference signals into free-space.

44. An optical code division multiple access transmission method as set forth in claim 43, further comprising a step of selectively reflecting each of the optical signal components in one of two different directions.

45. An optical code division multiple access transmission method as set forth in claim 44, wherein in the step of selectively reflecting, one subset of optical signal components are reflected at an angle and that the other subset of signal components continues along its original path.

46. An optical code division multiple access transmission method as set forth in claim 45, further comprising a step of programming the step of selectively reflecting each of the optical signal components so that different schemes of subsets of the signal components may be generated with different signal components for different users to allow multiple uniquely coded data streams to be transmitted.

47. An optical code division multiple access receiving method comprising steps of:

receiving a set of coded serial signal components and converting the coded serial signal components into parallel signal components;

separating the parallel signal components into two code groups using a match key for decoding, with the match key configured to match with a coding scheme used by a code division multiple access transmitting system for a plurality of users, thus, recovering two subsets of the signal components, each representing an associated binary data value from a user data streams, where the recovering comprises selectively reflecting each of the optical signal components in one of two different directions, wherein in the step of selectively reflecting, one subset of optical signal components are reflected at an angle and that the other subset of signal components continues along its original path;

programming the step of selectively reflecting each of the optical signal components so that different schemes of subsets of the signal components may be received with different signal components for different users to allow multiple uniquely coded data streams to be received and decoded;

separately combining each of the two subsets of signal components into a length of fiber;

converting the subsets of signal components into electrical user data;

wherein the method transmits data in time slots; and wherein the method further comprises a step of adjusting the path of each signal component so that the signal components are described in wavelength and time.

48. An optical code division multiple access receiving method as set forth in claim 47, wherein step of adjusting the path of each signal component comprises sub-steps of:

converting a received signal into signal components;

selectively altering the path length of individual signal components so that the time-slot ordering of the signal components is changed to produce properly-ordered signal components.

49. An optical code division multiple access receiving method as set forth in claim 48, wherein the step of selectively altering the path length of individual signal components is programmable, and wherein the method further comprises a step of programming the step of selectively altering the path length of individual signal components to provide for a desired time-slot ordering of the signal components.

* * * * *